United States Patent
Lovett (10) Patent No.: US 8,129,956 B2
(45) Date of Patent: *Mar. 6, 2012

(54) METHOD FOR MEASURING A TEMPERATURE IN AN ELECTRONIC DEVICE HAVING A BATTERY AND A MEMORY DEVICE

(75) Inventor: Simon J. Lovett, Boise, ID (US)

(73) Assignee: Round Rock Research, LLC, Mt. Kisco, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/910,287

(22) Filed: Oct. 22, 2010

(65) Prior Publication Data

US 2011/0037437 A1 Feb. 17, 2011

Related U.S. Application Data

(60) Continuation of application No. 12/273,626, filed on Nov. 19, 2008, now Pat. No. 7,821,235, which is a division of application No. 11/360,164, filed on Feb. 23, 2006, now Pat. No. 7,463,542, which is a continuation of application No. 10/613,236, filed on Jul. 3, 2003, now Pat. No. 7,034,507.

(51) Int. Cl.
  *H01M 10/44* (2006.01)
(52) U.S. Cl. .......................................... 320/150
(58) Field of Classification Search .................. 320/107, 320/112, 114, 115, 125, 150, 154
See application file for complete search history.

(56) References Cited

U.S. PATENT DOCUMENTS

| | | |
|---|---|---|
| 4,125,802 A | 11/1978 | Godard |
| 4,609,292 A | 9/1986 | Asano et al. |
| 5,276,843 A | 1/1994 | Tillinghast et al. |
| 5,680,359 A | 10/1997 | Jeong |
| 5,903,506 A | 5/1999 | Blodgett |
| 5,912,547 A | 6/1999 | Grabon |
| 5,956,289 A | 9/1999 | Norman et al. |
| 6,414,559 B1 | 7/2002 | Cole et al. |
| 6,538,944 B2 | 3/2003 | Choi |
| 6,597,614 B2 | 7/2003 | Nam et al. |
| 6,636,937 B2 | 10/2003 | Peter |
| 7,034,507 B2 * | 4/2006 | Lovett ........................ 320/150 |
| 2001/0014049 A1 | 8/2001 | Woo et al. |
| 2005/0248755 A1 | 11/2005 | Chou et al. |

* cited by examiner

*Primary Examiner* — Edward Tso
(74) *Attorney, Agent, or Firm* — Lerner, David, Littenberg, Krumholz & Mentlik LLP (57) ABSTRACT

A temperature sensing device can be embedded in a memory circuit in order to sense the temperature of the memory circuit. One oscillator generates a temperature variable signal that increases frequency as the temperature of the oscillator increases and decreases frequency when the temperature of the oscillator decreases. A temperature invariant oscillator generates a fixed width signal that is controlled by an oscillator read logic and indicates a temperature sense cycle. An n-bit counter is clocked by the temperature variable signal while the fixed width signal enables/inhibits the counter. The faster the counter counts, the larger the count value at the end of the sense cycle indicated by the fixed width signal. A larger count value indicates a warmer temperature. A smaller count value indicates a colder temperature.

14 Claims, 7 Drawing Sheets

METHOD FOR MEASURING A TEMPERATURE IN AN ELECTRONIC DEVICE HAVING A BATTERY AND A MEMORY DEVICE

CROSS REFERENCE TO RELATED APPLICATIONS

This application is a continuation of U.S. application Ser. No. 12/273,626, filed on Nov. 19, 2008, which issued on Oct. 26, 2010 as U.S. Pat. No. 7,821,235, which is a divisional of U.S. application Ser. No. 11/360,164, filed on Feb. 23, 2006, which issued on Dec. 9, 2008 as U.S. Pat. No. 7,463,542, which is a continuation of U.S. application Ser. No. 10/613, 236, filed on Jul. 3, 2003, which issued on Apr. 25, 2006 as U.S. Pat. No. 7,034,507, the disclosures of which are incorporated herein by reference.

TECHNICAL FIELD OF THE INVENTION

The present invention relates generally to oscillators and in particular the present invention relates to variable rate oscillators having temperature variable frequencies.

BACKGROUND OF THE INVENTION

It is sometime desirable to know the internal temperature of integrated circuits. For example, dynamic random access memory (DRAM) devices require periodic refresh cycles in order to maintain the integrity of the data stored in the memory. The temperature of the memory device affects the frequency at which the memory device needs to be refreshed. As the device heats up, the cells lose their ability to hold a charge due to current leakage. Therefore, the warmer the device the more often it has to be refreshed.

Designers typically take into account the worst case requirement for refreshing a DRAM and design the memory to refresh at a fixed rate consistent with the maximum operating temperature of the part. However, the faster refresh rate is not required when the device is operating at a cooler temperature, thus wasting power. It would therefore be beneficial to be able to determine the memory device's internal temperature in order to adjust the refresh rate in response to changing temperature. In a battery powered electronic device, a smaller power requirement could translate into either a smaller battery or longer battery life.

Additionally, some battery powered electronic devices use ambient and device temperature readings to monitor system heating during battery charging. Such devices typically require at least one external temperature sensor that adds to the weight and expense of the electronic device. In a market where profit margins are small and size/weight might determine marketing advantage, a less expensive and smaller device is more desirable.

For the reasons stated above, and for other reasons stated below which will become apparent to those skilled in the art upon reading and understanding the present specification, there is a need in the art for a temperature sensing device that can be used by both an integrated circuit and any peripheral circuitry.

DETAILED DESCRIPTION

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

Figure 1:
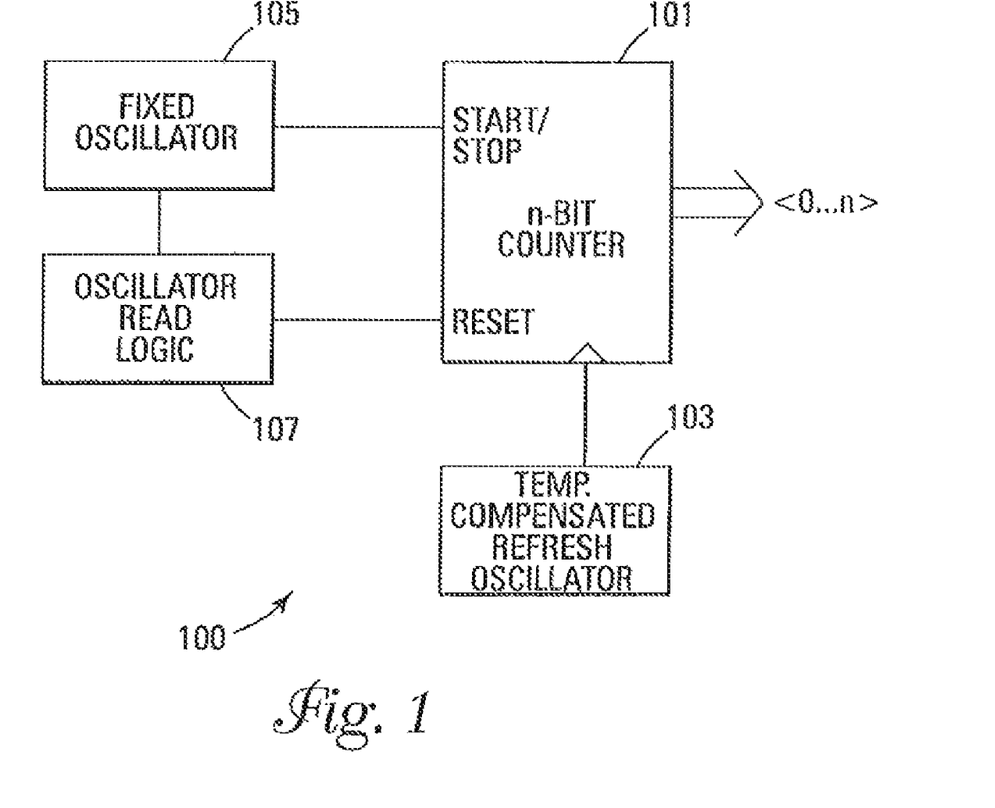
FIG. 1 shows a block diagram of one embodiment of a temperature sensing device of the present invention.

FIG. 1 illustrates a block diagram of one embodiment of a temperature sensing device 100 of the present invention. An n-bit counter 101 generates a count that indicates the temperature sensed by the device 100. In one embodiment, the n-bit counter generates a 16-bit count. Alternate embodiments generate other count lengths.

The counter 101 is clocked by a signal generated by a temperature compensated refresh oscillator 103. The clock signal has a variable period such as the lower waveform in FIG. 2. The period of this signal increases as the temperature of the oscillator 103 decreases and the period decreases as the temperature of the oscillator 103 increases.

In one embodiment, the oscillator 103 may output a square-wave that has a period of 9 microseconds when the oscillator is at its warmest value. At its coldest value, the oscillator 103 may output a 500 microsecond signal. These periods are for purposes of illustration only. The present invention is not limited to any one period for any temperature or temperature range.

The counter 101 is enabled by a fixed rate oscillator 105 that is temperature invariant. The fixed rate oscillator 105 generates a sense time signal that has a fixed width such as the signal illustrated in the top waveform of FIG. 2. In one embodiment, this width is 5 milliseconds. Alternate embodiments use other widths.

The width of the sense time signal is determined by the frequency range of the variable rate, temperature compensated oscillator 103. The greater the quantity of cycles of the variable rate signal that can occur during a sense time, the more accurate the resulting temperature indication from the counter 101.

The sense time signal is used as a known temperature sense time interval. When it is at a logical high value, the counter 101 is allowed to count. This is considered the sense time interval. When the fixed period signal is at a logical low value, the counter 101 is inhibited.

An oscillator read logic block 107 is coupled to both the fixed oscillator 105 and the n-bit counter 101. The read logic block 107 generates a reset pulse prior to each sense time interval. This pulse resets the counter to a default status, such as zero, so that a new temperature value can be determined each time.

The read logic block 107 also triggers the fixed oscillator 105 to output its logical high, sense time signal. Since a silicon device does not change temperature rapidly, sense time signal does not have to be generated very often. In one embodiment, the time between triggering the sense time signal is in the range of 500 milliseconds to 1 second. Alternate embodiments may use different times.

The elapsed time between successive, fixed read time intervals reduces overall current drawn by the system. The circuit is "awakened" periodically, makes a measurement during the fixed read time interval then shuts down until the next fixed read time interval. This lowers the average current drawn by the system.

In operation, the n-bit counter 101 is first reset to zero by the oscillator read logic 107 prior to the start of a read time interval. The fixed period signal goes high to enable the counter 101 so that the clock input (i.e., variable rate signal) causes the counter to count up at a rate that varies with temperature. After the fixed oscillator signal goes low to indicate an end of the sense time interval and inhibit any further counting during the sense cycle. The resulting counter output indicates the temperature of the integrated circuit in which the oscillator circuit is embedded. A relatively high count indicates a higher sensed temperature. A relatively low count indicates a lower sensed temperature.

In one embodiment, the count value output from the counter 101 is a 16-bit value. This value can be read by a controller or other circuitry within the integrated circuit and used for various operations requiring an operating temperature. The 16-bit counter value results in being able to differentiate between a greater number of temperatures in a temperature range for the integrated circuit. The present invention, however, is not limited to any one counter bit length.

Figure 2:
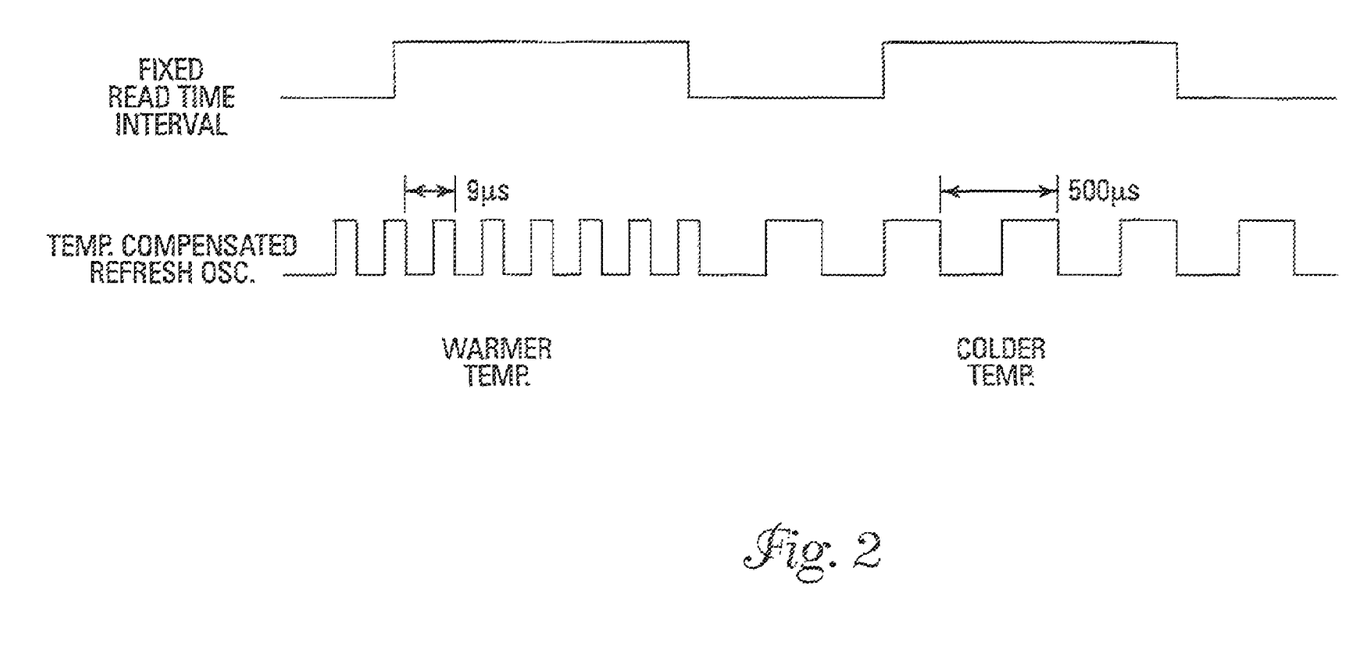
FIG. 2 shows timing diagram in accordance with the embodiment of FIG. 1.

FIG. 2 illustrates a timing diagram of signals generated by the temperature sensing device of FIG. 1. The upper waveform illustrates the temperature invariant, sense time signal with a width measured in milliseconds. The lower waveform illustrates the output of the temperature compensated refresh oscillator. The periodicity of this signal varies as the temperature of the circuit of FIG. 1 changes.

The left portion of the lower waveform indicates the period of the temperature compensated refresh oscillator signal when the temperature of the temperature sensing device is warmer. This portion of the signal has a greater number of pulses during the high period of the fixed read time interval signal. In the illustrated embodiment, the period of this side of the signal is 9 microseconds.

The right portion of the lower waveform indicates the period of the temperature compensated refresh oscillator signal when the temperature of the temperature sensing device is colder. This portion of the signal has the lesser number of pulses during the high period of the fixed read time interval signal. In this embodiment, the period is 500 microseconds.

The waveforms of FIG. 2 are for purposes of illustration only. They are not to scale and do not limit the oscillators of the present invention to any one set of frequencies.

Figure 3:
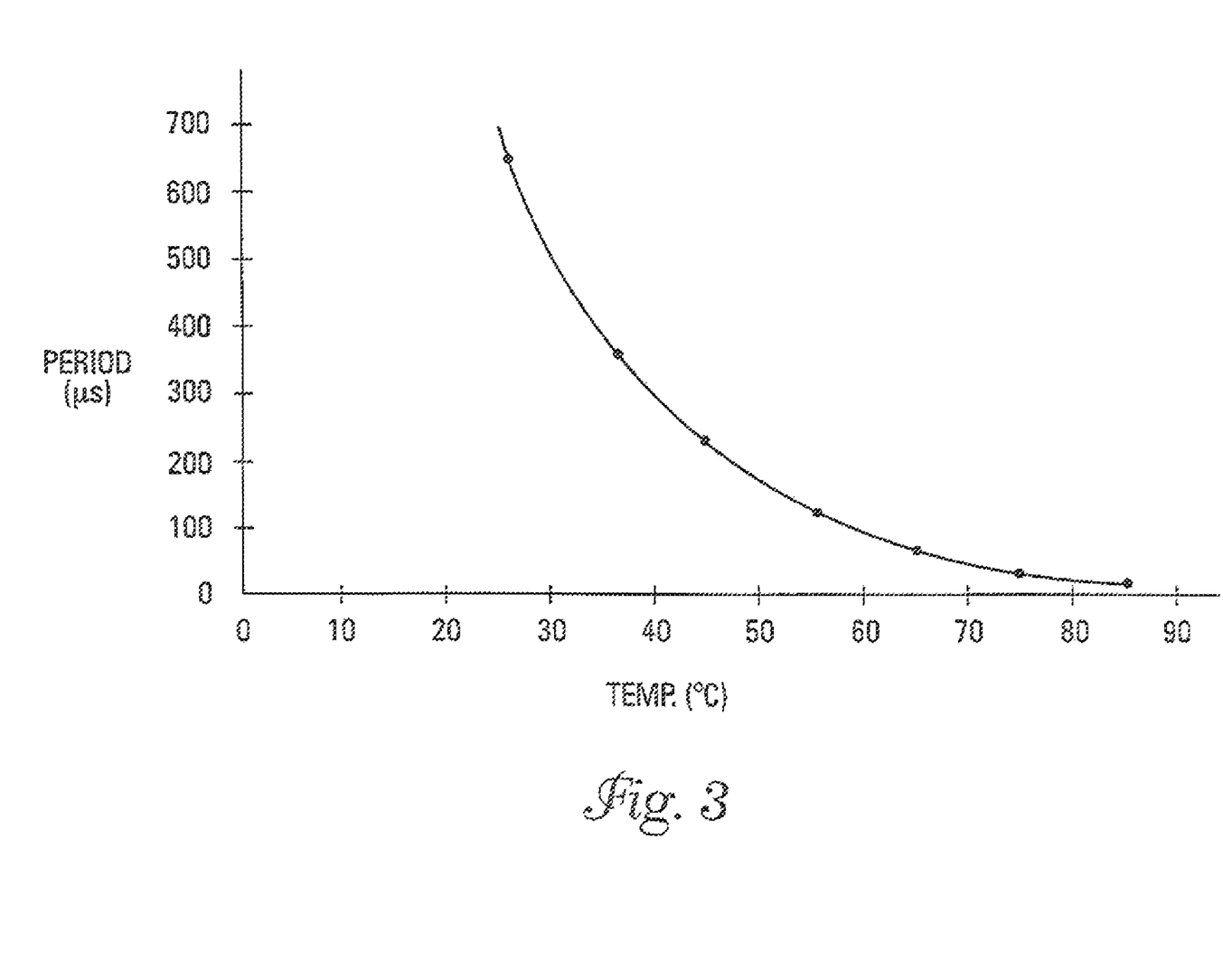
FIG. 3 shows a graphical representation of the temperature of an integrated circuit versus the time period of the temperature compensated refresh oscillator in accordance with the embodiment of FIG. 1.

FIG. 3 illustrates a graphical plot of the temperature of an integrated circuit into which the temperature sensing device of the present invention is embedded versus the period of the variable rate signal output from the temperature compensated refresh oscillator. This graph shows that as the temperature of the part increases, the period (in microseconds) decreases.

Figure 4:
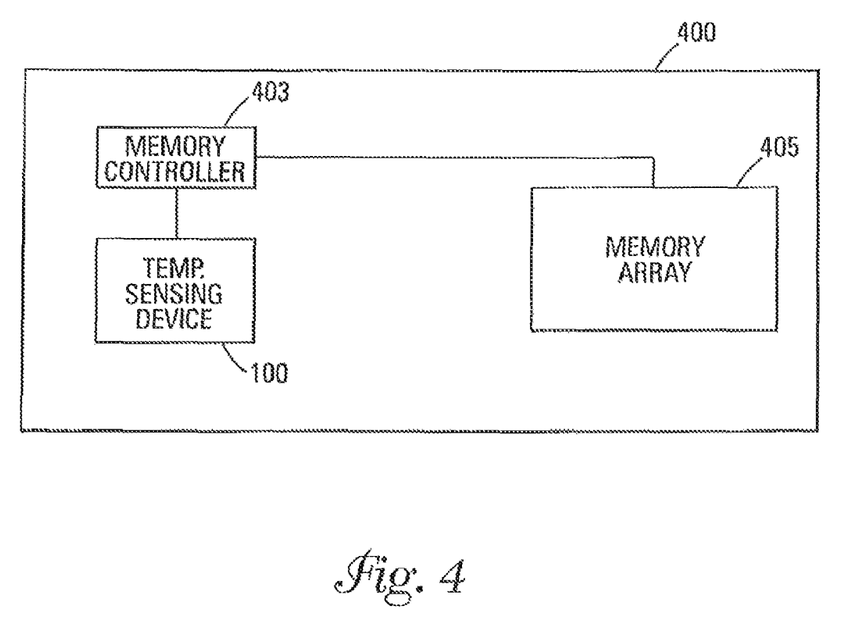
FIG. 4 shows a block diagram of one embodiment of a memory device having an embedded temperature sensing device in accordance with FIG. 1.

FIG. 4 illustrates one embodiment of an implementation of the temperature sensing 100 device of the present invention. In this embodiment, the temperature sensing device 100 is embedded in a memory device 400. Examples of such a memory devices can be dynamic random access memories (DRAM), pseudo static RAMs (PSRAM), or flash memories. Alternate embodiments use other types of memory.

In a memory device that uses the temperature to determine refresh rate, such as a DRAM, the memory's refresh controller or memory controller 403 can read the count value and use it to determine the refresh rate for the memory array 405.

The controller 403 can use the count from the temperature sensing device 100 in various ways. In one embodiment, the controller contains or has access to a table that lists various count values and their representative temperatures. For example, a count of FFFFH may indicate the maximum temperature of the part (e.g., 85° C.). The controller can then increase the refresh rate of the memory array 405. If the count indicated a colder temperature, the controller can decrease the refresh rate of the memory array 405.

In another embodiment, the controller contains or has access to a table of count value thresholds, each threshold indicating a different refresh rate. For example, a count value between 0000H and 00AAH may indicate a first refresh rate. A count value between 00BBH and 0100H may indicate a slightly higher refresh rate since the higher count indicates a higher temperature.

Figure 5:
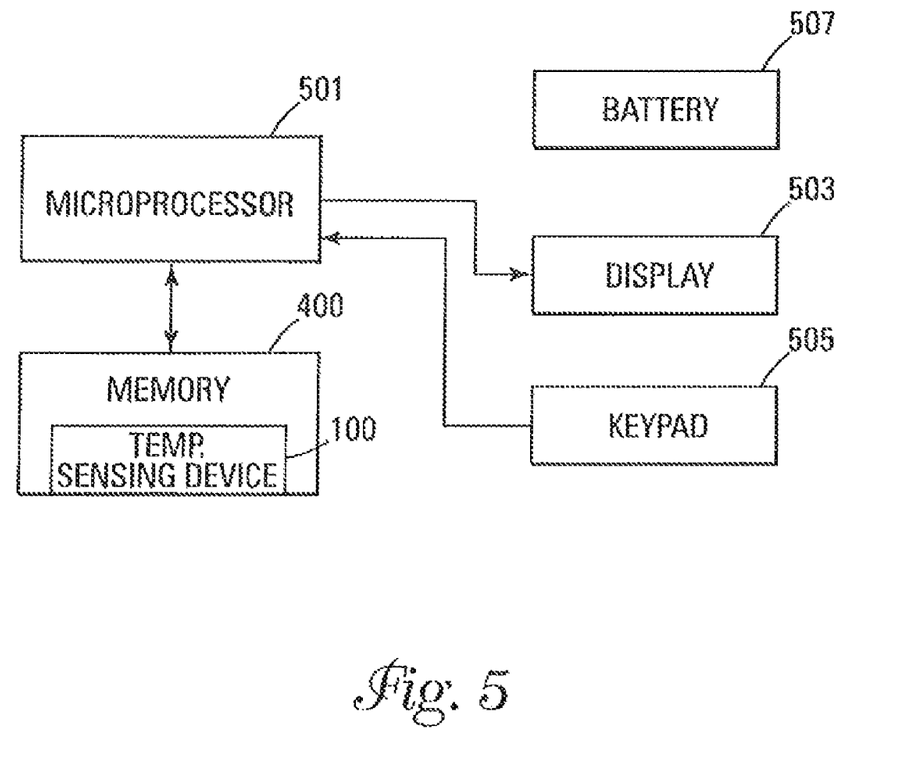
FIG. 5 shows a block diagram of one embodiment of an electronic device having a memory device in accordance with the embodiment of FIG. 4.

FIG. 5 illustrates a block diagram of another implementation of the temperature sensing device 100 of the present invention. This embodiment is a battery powered electronic device such as a cellular telephone.

Typical cellular telephones use an external discrete temperature sensor to monitor the temperature of the battery while it is charging. The sensor allows the charger to vary the charging current to keep the battery voltage below a predetermined threshold so that the telephone does not overheat.

Since cellular telephones are typically small devices, the heat from the battery will heat the circuit elements of the telephone including a memory device that includes the temperature sensing device 100 of the present invention. Accordingly, the temperature of the memory device can be used to infer the battery temperature. Taking a background temperature measurement at ambient prior to the start of the charging process can compensate for the effect of ambient temperature differences. The temperature acceleration is then monitored as the charging process proceeds. If the operating current of the memory device is low (i.e., 10's of milliamps), the effects of die heating from the active current consumption are small and can be compensated for.

The embodiment of FIG. 5 is comprised of a memory device 400 with an embedded temperature sensing device 100. One example of such a memory device is illustrated above with reference to FIG. 4.

The memory device is coupled to a microprocessor 501 or other type of controller circuit that controls the operation of the cellular telephone. A display 503 is used by the microprocessor 501 to display information to the telephone user. The display may be liquid crystal display (LCD), light emitting diode (LED) display, or some other type of display.

A keypad or keyboard 505 is used to enter data such as names and telephone numbers. The keypad 505 can also be used to communicate instructions to the microprocessor 501.

A battery 507 powers the telephone. The battery can be of any technology such as lithium ion, nickel cadmium, or other types.

Figure 6:
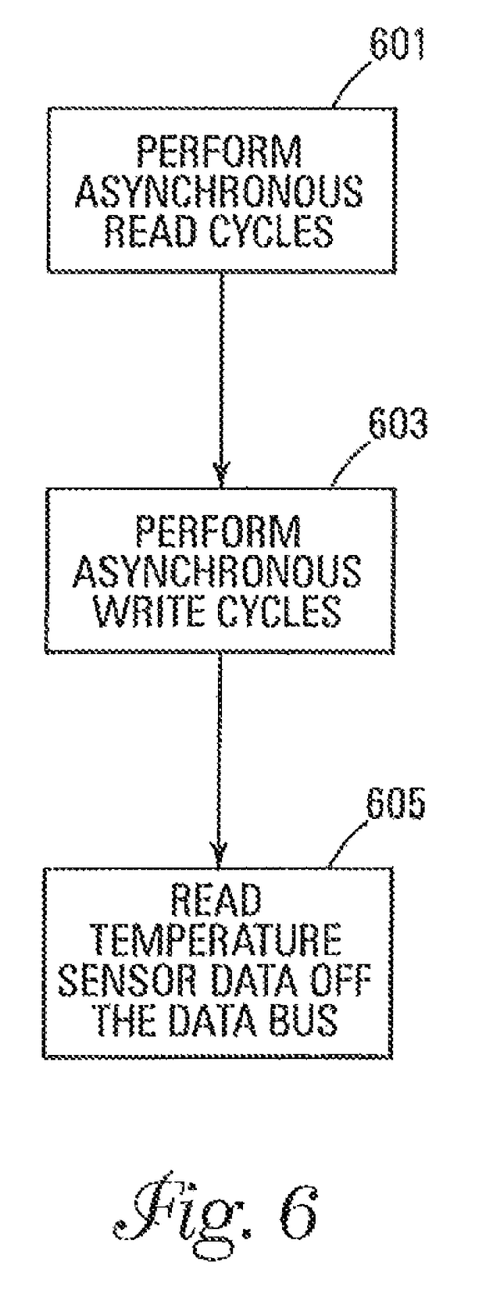
FIG. 6 shows a flow chart of one embodiment of a memory read cycle enabling an external system to read the temperature sensing device of the present invention.

FIG. 6 illustrates a flow chart of one embodiment of a memory read cycle enabling an external system to read the temperature sensing device of the present invention that is embedded in a memory device. The method reads the device as if it is an internal register and therefore uses an address that is reserved for system use).

The method performs two asynchronous read cycles to the system address 601. In one embodiment, this address is the highest address in the memory address range. Two asynchronous write cycles are then performed to this address 603. The write data pattern indicates which internal register is to be read from. For example, if 02H is assigned to the temperature sensing device, this data pattern would be written on the two write cycles. The 16-bit counter value that represents the temperature is now available on the data bus 605.

The method of FIG. 6 illustrates only one embodiment for accessing the counter value that represents the temperature of the integrated circuit. Alternate embodiments might include performing only one read and write cycle with the appropriate register address in the data field.

Figure 7:
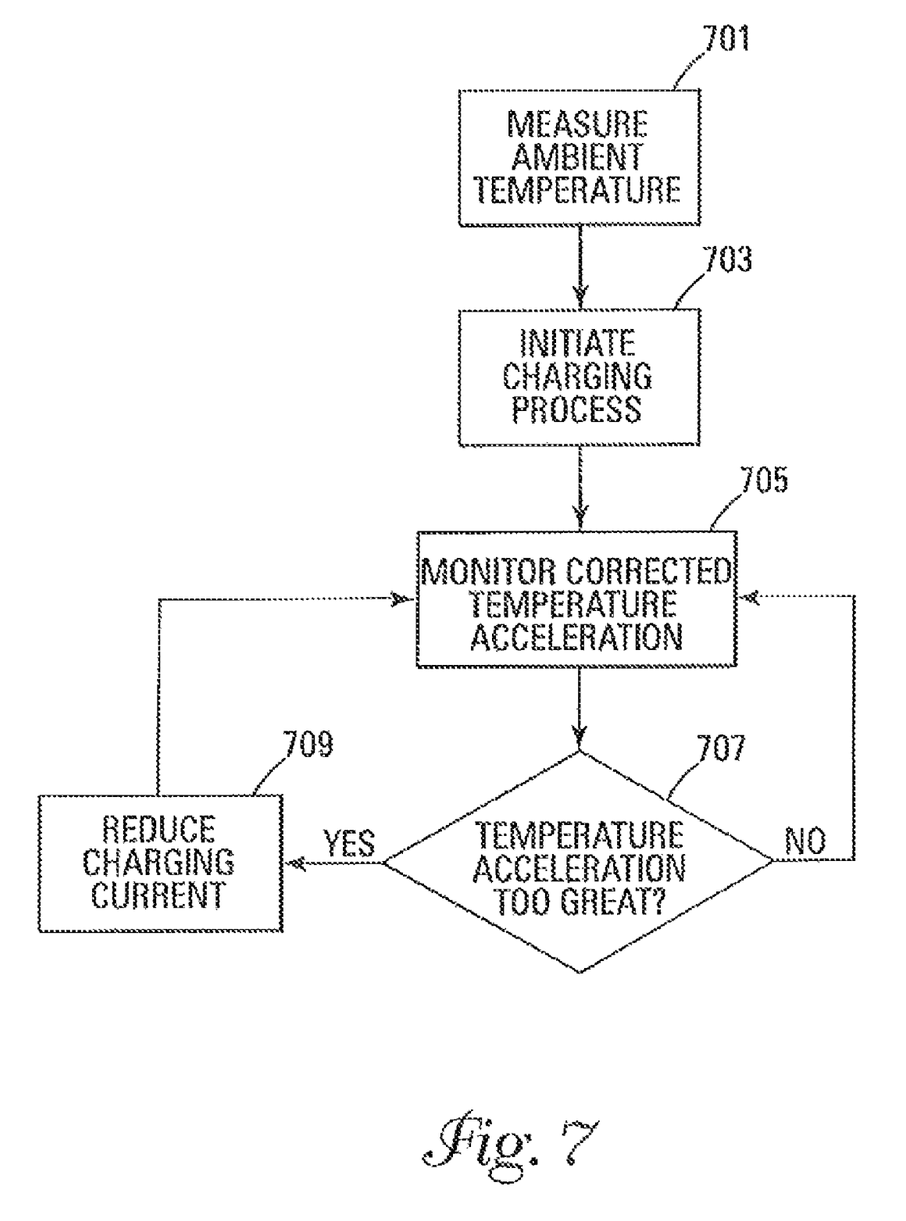
FIG. 7 shows a flow chart of one embodiment of a temperature sensing method of the present invention.

FIG. 7 illustrates a flow chart of one embodiment of a temperature sensing method of the present invention. This method could be used in a cellular telephone such as the embodiment illustrated above in FIG. 5 or in any other electronic device that uses a battery.

In this embodiment, an initial reading of the ambient temperature is done prior to charging the battery 701. The charging process is then initiated 703. The corrected temperature (corrected for ambient temperature) is monitored during the charging process 705. The monitoring can be accomplished either periodically or at random intervals. When the temperature acceleration is too great, indicating that the temperature will reach a dangerous temperature threshold 707, the charging current is reduced 709.

The corrected temperature monitoring for this method of the present invention is accomplished by reading the temperature sensing device of the present invention as discussed previously. The initially measured ambient temperature is then subtracted from the sensed temperature to generate the corrected temperature that is used to monitor the temperature acceleration.

CONCLUSION

The embodiments of the present invention provide a temperature sensing device that can be embedded in an integrated circuit such as a memory device. The temperature sensing device generates a counter value that indicates the temperature of the memory device. This temperature can then be read by a modified memory read cycle that enables an external system to access the temperature indication.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for measuring a temperature of an electronic device comprising a chargeable battery and a DRAM having an embedded temperature sensing device, the method comprising:
    measuring an ambient temperature with the temperature sensing device;
    measuring the temperature of the battery with the temperature sensing device;
    performing at least one asynchronous read cycle to a predetermined memory address of the DRAM;
    performing at least one asynchronous write cycle comprising a data pattern that indicates an internal register of the temperature sensing circuit;
    reading a temperature indication off of a data bus in the DRAM;
    generating the temperature indication as an n-bit count value in response to output of a temperature variant oscillator received at a counter, wherein the count value is higher for warmer temperatures and lower for colder temperatures;
    correcting the measured battery temperature in response to the ambient temperature to produce a corrected battery temperature; and
    when the corrected battery temperature indicates a temperature acceleration that is greater than a predetermined threshold, reducing a charging current to the battery.

2. The method of claim 1 further comprising resetting the count value to a default value prior to enabling the counter.

3. The method of claim 2 wherein the default value is zero.

4. A method for measuring a temperature in an electronic device having a memory device with a temperature sensor and powered by a battery, the method comprising:
    measuring an ambient temperature of the electronic device;
    measuring a temperature of the battery;
    reading a temperature indication off of a data bus in the memory device;
    resetting a counter to a default value prior to enabling the counter;
    generating the temperature indication as an n-bit count value in response to output of a temperature variant oscillator received at the counter;
    correcting the measured battery temperature in response to the ambient temperature to produce a corrected battery temperature; and
    varying a charging current to the battery in response to an indicated temperature acceleration of the corrected battery temperature.

5. The method of claim 4 wherein correcting the measured battery temperature is performed at one of periodically or at random intervals.

6. The method of claim 4 wherein the electronic device is a cellular telephone.

7. The method of claim 4 wherein varying the charging current of the battery comprises reducing the charging current.

8. The method of claim 4 wherein correcting the measured battery temperature comprises subtracting the ambient temperature from the measured battery temperature.

9. A method for measuring a temperature in an electronic device having a memory device with a temperature sensor and powered by a battery, the method comprising:

measuring an ambient temperature of the electronic device;

measuring a temperature of the battery;

reading a temperature indication off of a data bus in the memory device;

generating the temperature indication as an n-bit count value in response to output of a temperature variant oscillator received at a counter, wherein the count value is higher for warmer temperatures and lower for colder temperatures;

generating a temperature acceleration by continuously correcting the measured battery temperature in response to the ambient temperature to produce a corrected battery temperature; and varying a charging current to the battery in response to the corrected battery temperature indicating a temperature acceleration that is greater than a temperature acceleration threshold.

10. The method of claim 9 wherein correcting the measured battery temperature comprises subtracting the ambient temperature from the measured battery temperature at periodic time intervals.

11. The method of claim 10 wherein subtracting the ambient temperature from the measured battery temperature occurs at periodic time intervals to generate the temperature acceleration.

12. The method of claim 9 wherein measuring the ambient temperature is accomplished prior to the charging current being applied to the battery.

13. The method of claim 12 wherein the charging current indicates a charging process on the battery.

14. The method of claim 9 wherein measuring the ambient temperature occurs only once prior to initiation of a charging process.

* * * * *